Oct. 25, 1966  H. HACK  3,280,638
MACHINE FOR BALANCING ROTORS
Filed Jan. 22, 1964  3 Sheets-Sheet 1

329,280,638
MACHINE FOR BALANCING ROTORS
Heinrich Hack, Darmstadt, Germany, assignor to Carl Schenck Maschinenfabrik G.m.b.H., Darmstadt, Germany, a corporation of Germany
Filed Jan. 22, 1964, Ser. No. 339,473
Claims priority, application Germany, Feb. 1, 1961, Sch 29,152; Jan. 26, 1963, Sch 32,666
10 Claims. (Cl. 73—462)

This is a continuation-in-part of my copending parent application Serial No. 169,494, filed January 29, 1962 which issued on July 21, 1964 as United States Patent No. 3,141,338.

My invention relates to machines for determining the unbalance of rotating workpieces. Also the invention is related to those disclosed and claimed in the copending applications Serial No. 137,872, filed September 13, 1961, which issued on February 25, 1964 as United States Patent No. 3,122,020, and Serial No. 69,224, filed November 14, 1960, which issued on March 5, 1963 as United States Patent No. 3,079,801, both assigned to the assignee of the present invention.

Balancing machines for measuring the unbalance of a rotating workpiece, especially by electrical measuring means, require that the response or indication of the measuring instrument be calibrated before the unbalance of an unknown workpiece can be correctly determined as to the unbalance magnitude and angular position, within any predetermined radial correction plane. It is therefore necessary to perform a calibrating run with the balancing machine prior to subjecting an unknown workpiece to a balancing run. The calibration is performed by rotating a known workpiece after auxiliary balancing weights of known magnitude and angular position have been attached to the workpiece in the desired reference or correction plane or planes. This produces a predetermined response to a predetermined unbalance. Subsequently it is possible to determine the unbalance of an unknown workpiece during a measuring by indirectly comparing the instrument indication caused by the unknown workpiece with the instrument indication previously obtained during the calibrating run for the known unbalance. The comparison furnishes a measure for the required correction, such as the addition or elimination of material at a location from the workpiece, for eliminating or satisfactorily minimizing unbalance.

In balancing machines, vibratorily supported journal means support the rotating workpiece whose unbalance is measured during the unbalance measuring run by determining the vibratory deflections of the journal means, with vibration measuring equipment of the type described in the above-mentioned copending application.

In low-tuned balancing machines where, within the range of measuring speeds, the natural frequency of the vibratory system, consisting essentially of the journal means and of a proportion of the workpiece mass acting upon the journal means, is lower than the natural frequency or spring constant of the vibratory journal support, then the empirical result ascertained during the calibrating run at the rotational speed above the critical speed, is essentially dependent upon the mass and the mass distribution of the workpiece or rotor employed for the calibrating run. Consequently, the deflection $a$ of the vibratory journal structure during a measuring run is proportional to the unbalance $U$ and inversely proportional to the mass $G$ of the rotating workpiece, in accordance with the equation $a=U/G$.

According to my above-mentioned copending parent application Serial No. 169,494, I provide a direct comparative method and avoid the calibrating run by imparting, during a measuring run of an unknown workpiece an oscillatory excitation of known power, and frequency differing from the workpiece rotation frequency, upon the oscillating workpiece holder of the balancing machine. As a result, the measuring run yields a measurable effect $a$ caused by the workpiece unbalance, and also an effect $a'$ caused by the known superimposed excitation which are both compared with each other, namely $a=U/G$ and $a'=E/G$ wherein E denotes the known excitation for example in mm. g. It follows from the equation $$G=U/a=E/a'$$

that $$U=Ea/a'$$

According to the latter equation, the unbalance $U$ of the workpiece is ascertained and expressed independently of the workpiece weight.

When performing a balancing operation in a plurality of reference or correction planes of the rotating workpiece, the weight distribution in the workpiece affects the magnitude of the unbalance-responsive oscillatory deflections at the workpiece bearings. For that reason, more than one workpiece run had, prior to my parent application, been necessary for preliminary calibration, and the different influence of the unbalance along the workpiece axis upon the oscillation measurement also had to be taken into account. For this purpose, a so-called electric plane-separation network of potentiometric resistors has been used. In order to simplify such plural-plane balancing, my above-mentioned copending application Serial No. 137,872 discloses an improvement according to which it was necessary that the journalling means be deflectable in two directions within each radial correction plane and required that the journalling structures used as the two ends of the workpiece have respective masses as closely equal to each other as feasible. The invention in the parent application serves to further improve and simplify unbalance-measuring methods and machines of the type dealt within my above-mentioned copending applications so as to afford a separate and distinct determination of the respective reactions caused in the workpiece-journalling structure by the unbalance and by the additional excitation respectively, without requiring the journalling structure to be capable of vibrating in more than one direction of a single plane. It also permits the mentioned mutually distinct determination of unbalance-responsive and excitation-responsive effects with the aid of relatively simple or conventional electrical measuring devices, for example multiplying systems such as watt-meters or Hall generators.

However, the devices of my above-identified copending parent application cannot easily determine the correction required in all desired radial correction planes.

It is an object of my invention to measure the unbalance in any plane directly and in a simple manner.

According to a feature of my invention, I measure the unbalance directly in any correction plane by coupling the journalling means together and moving the oscillation transducers and the extra exciters to the desired correction planes on the coupling means. Thus as soon as the workpiece is placed and the adjustments arranged, the entire measuring run can be started and completed. Essentially the oscillation exciters or transducers to be provided in the correction planes are adjustably arranged on the correction planes of the workpiece supported in the balancing machine.

The above-mentioned and further objects, advantages and features of my invention, said features being set forth with particularity in the claims annexed hereto, will be apparent from, and will be described in, the following with reference to the embodiments of balancing equipment illustrated by way of example in the accompanying drawings, in which:

Figure 1:
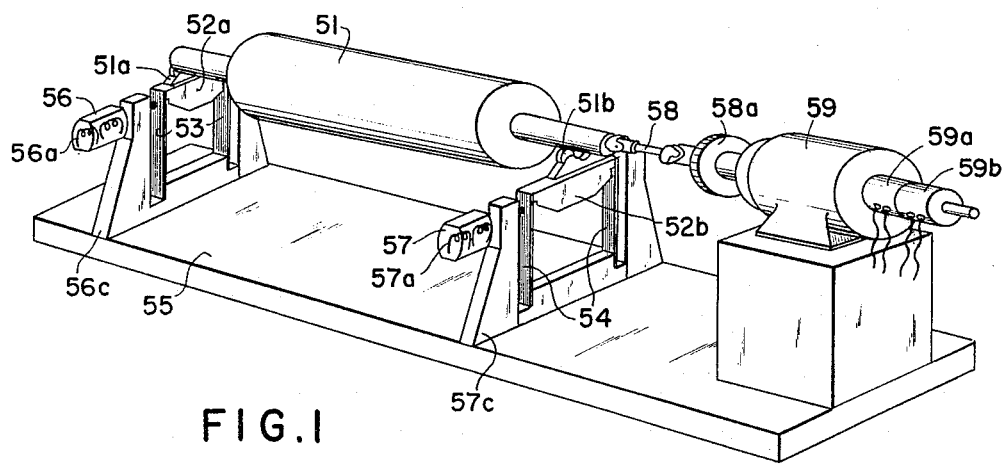
FIG. 1 is a schematic perspective view of a balancing machine having a horizontal axis of workpiece rotation for unbalance measurement and correction in more than one plane according to my copending parent application.

The balancing machine of FIG. 1 serves for plural-plane (dynamic) balancing. The workpiece 51 is journalled in roller bearings 51a and 51b of journalling bridges 52a and 52b which are supported on pairs of leaf springs 53 and 54 whose lower ends are fastened to the machine bed structure 55. Joined with the bed structure are rigid standards 56c and 57c on which respective transducers 56 and 57 are mounted. Each transducer has a movable rod mechanically coupled with respective bridges 52a, 52b for transmitting vibratory motion from each bridge to the appertaining transducer, and vice versa. That is, in this embodiment each of the transducers 56 and 57 is designed as a combined vibration pickup and vibration exciter. For this purpose, the transducer 56 is provided with two mutually insulated windings 56a and 56aa (FIG. 2), and the transducer 57 is correspondingly provided with two windings 57a and 57aa. When the respective windings 56a and 57a are energized by alternating current they impart corresponding vibrations of the same frequency to the movable transmitting member of the transducer which imparts these movements to the journalling bridge 52a or 52b for the purpose of superimposing thereon the above-mentioned auxiliary excitation. The second winding 56aa or 57aa in each transducer serves to translate mechanical vibrations of the bridge 52a, 52b into corresponding alternating voltage and thus operates as a pickup. This voltage of course is composed of a component caused by the above-mentioned superimposed excitation and of a component due to any unbalance of the workpiece 51 during rotation of the latter.

The workpiece 51 is driven from an electric motor 59 through a universal-link (cardanic) shaft 58 and preferably carries a disc 58a with a peripheral scale of indicia coacting with a fixed reference marker (not shown) and correlated to indicia on the rotationally adjustable stators of two phase-reference generators 59a, 59b. This permits setting the generators to a phase position of known correlation to the angular positions of the workpiece. The phase-reference generators 59a, 59b are mounted on the motor shaft. They consist, for example, of dynamos that furnish respective sinusoidal voltages. The respective stators of the two generators 59a and 59b can be displaced about the axis of rotation by means of a worm gearing actuable by respective crank mechanisms shown at 59c and 59d in FIG. 2. This permits selecting the coordinate directions or angular position relative to which the unbalance is to be measured in the respective reference planes.

Figure 2:
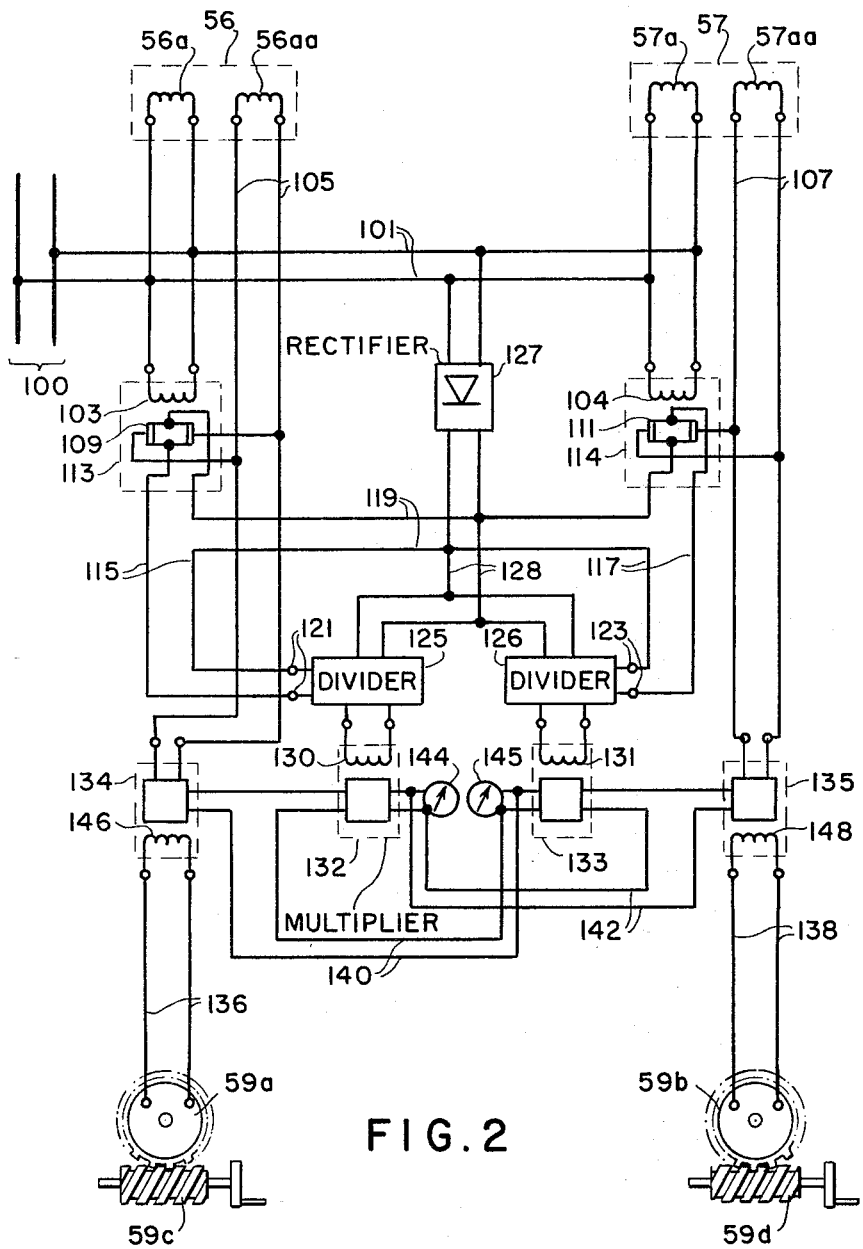
FIG. 2 is an electric circuit diagram relating to the balancing machine according to FIG. 1.

The transducers 56, 57 and the phase-reference generators 59a, 59b form part of an electric measuring network which, according to FIG. 2, also comprises a number of electric computer units, namely multipliers 113, 114, 132, 134, 133, 135 and dividers or ratio computers 125 and 126, as well as indicating or recording instruments 144 and 145.

It is essential that the exciters 56a and 57a are operated at a frequency considerably (i.e. filterably) different from the rotation frequency of the workpiece 1 during the measuring run. For example, the measuring run may be performed with a workpiece frequency of 600 r.p.m. (=10 c.p.s.) while the exciters 56a and 57a receive alternating current of 60 c.p.s. Of course, different numerical frequency values and a different frequency ratio may be chosen, although it is preferable to keep the two frequencies sufficiently distinct for avoiding the necessity of employing appreciable amounts of filtering equipment in the electric measuring components. The separation of the mechanical vibrations and resulting pickup voltages caused by workpiece-inherent unbalance on the one hand and by the superimposed auxiliary excitation from the exciters on the other hand is due to the fact that the electric measuring circuits involve a filtering action which, in the embodiment of FIG. 1, is due to the inherent wattmetric performance of the Hall generators 113, 114, 134 and 135. As mentioned, a Hall generator is essentially a multiplying device. That is, the output voltage taken from the Hall electrodes of the Hall plate, such as plate 109 in Hall generator 113, is proportional to the vectorial product of the two input currents passing through the Hall plate from the pickup and through the field coil from the phase-reference generator respectively. More specifically, the output voltage is proportional to the product of one input current times the in-phase component of the other input current ($I_1 = \cos \varphi I_2$, wherein $I_1$ and $I_2$ are the two input currents and $\cos \varphi$ is the phase displacement between the two currents). This however, applies only to currents of the same frequency, the device being not responsive to currents of respectively different frequencies. Consequently, while the voltage from pickup 56aa is not sinusoidal but constitutes a mixture or superposition of component voltages, the Hall generator 113 responds primarily to the one component voltage from pickup 56aa that is caused by the superimposed vibrations originating from the auxiliary exciter 56a. This has a frequency different from the rotation frequency of the workpiece 1, because only the latter pickup voltage is in synchronism with the excitation voltage supplied from the alternating-current line 100 to the exciter 56a. However, the Hall generator 134 responds only to the component from pickup 56aa that is due to unbalance vibration. This is because only this vibration is in synchronism with the reference voltage from reference generator 59a.

The excitation windings 56a and 57a of the transducers 56 and 57 are energized by constant alternating voltage of a suitable frequency, for example 50 or 60 c.p.s., through connecting leads 101 from an alternating-current source 100 such as a utility line. Connected to the same alternating voltage are the field windings 103 and 104 of the two multipliers 113 and 114 which in this case consist of Hall generators. The pickup windings 56aa and 57aa of the two transducers furnish corresponding pickup voltages which drive corresponding alternating currents through leads 105 and 107 and through the respective Hall plates 109, 111 of the same two Hall generators 113 and 114. The output leads 115 and 117 of the repective Hall generators 113 and 114 are connected with each other through leads 119 and are also connected through a rectifier 127 with the alternating-current source 100. As a result, there occurs across the output leads 115 of the Hall generator 113 a voltage which stems from the excitation imposed upon the left journalling bridge 52a and from the influence of the auxiliary excitation at the right bearing bridge 52b, this voltage of leads 115 being thus dependent upon the mass and mass distribution of the vibratory system consituted by the rotating workpiece and the vibrating machine structure on which the workpiece is journalled.

Analogously there occurs across the output leads 117 of the Hall generator 114 a voltage which depends upon the mass and mass distribution of the vibratory system and which stems from the auxiliary excitation superimposed upon the right journalling bridge 52b, as well as from a portion of the auxiliary excitation imposed upon the left bridge 52a. By subtracting from these two output voltage magnitudes the voltage of the rectifier 127, which corresponds to the auxiliary excitation and is supplied through the leads 119, there remains at the input terminals 121 and 123 of the respective ratio-computer units 125 and 126 a voltage proportional only to the influence magnitudes ER′ and EL′ respectively, both ratio units 125 and 126 being energized by direct current through leads 128. Each divider unit 125, 126 has two input circuits, namely one circuit connected to the leads 128 for receiving a constant voltage from rectifier 127, and another input circuit connected to the terminals 121 or 123 for receiving respective product voltages from the multipliers 113 and 114. The two divider units have respective output circuits which furnish a voltage proportional to the ratio of the two voltages impressed upon the two input circuits. These two output circuits of the divider units are connected to the respective field coils 130 and 131 of two further multipliers 132 and 133.

It will be understood that the two divider units 125 and 126 receive through leads 128 the rectified auxiliary exciter voltage $EL=ER$. Thus the respective field coils 130 and 131 of Hall generators 132 and 133 receive from the divider units respective voltages that are proportional to the ratios $EL/EL'$ and $ER/ER'$. These two terms are each multiplied with the influence magnitudes UL′ and UR′ in order to separately obtain the respective unbalance components UL and UR respectively. This is done as follows.

The two multipliers 134 and 135, both being identical in design and performance with those described previously, receive input voltage through leads 105 and 107 from the respective pickup windings 56aa and 57aa of the two transducers. The two pickup voltages drive corresponding currents through the Hall plates of the two Hall generators. The voltages comprise components that are indicative of the workpiece unbalance at the frequency of the workpiece rotation, namely as follows. The voltage supplied by leads 105 to Hall generator 134 comprises a component that corresponds to the workpiece unbalance UL, and a component that corresponds to the influence magnitude UR′ of the unbalance from the right reference plane. Analogously the voltage supplied by leads 107 to Hall generator 135 comprises a component that corresponds to the workpiece unbalance UR at the right reference plane, and also a component that corresponds to the influence UL′ stemming from the unbalance of the workpiece at the left correction plane.

The field coils 146 and 148 of respective Hall generators 134 and 135 are connected by leads 136, 138 to the respective phase-reference generators 59a and 59b. Thus the phase-reference voltage becomes multiplied with the composite pickup voltage from transducer windings 56aa and 57aa respectively. As a result of the multiplication in each Hall generator 134 and 135, these Hall generators operate to filter the magnitudes UL and UR′ as well as the magnitudes UR and UL′ out of the frequency mixture.

By means of connecting leads 140, the magnitude UL is subtracted from the sum $UL+UR'$ coming from the Hall generator 134. Analogously, by means of leads 142 the magnitude UR is subtracted from the sum $$UR+UL'$$

coming from the Hall generator 135. There remains the magnitude UR′ which the Hall generator 132 multiplies by the quotient $ER/ER'$ and thus furnishes the result UR to the measuring instrument 144. Correspondingly, the value UL′ is multiplied in Hall generator 133 by the quotient value $EL/EL'$ coming from the divider unit 126, so that the Hall generator 133 furnishes the output magnitude UL to the measuring instrument 145.

The divider units correspond to that of U.S. Patent 3,003,698 and are also described in my copending parent application.

The instrument 144 directly indicates or records the unbalance magnitude in the right reference plane UR and the instrument 145 directly responds to the unbalance magnitude UL in the left reference plane, these results being obtained virtually instantaneously as soon as the workpiece has assumed the proper speed of the measuring run, without requiring any preceding calibrating operation nor any change in adjustment if a change is made from one kind or size of workpiece to another. This favorable performance is not predicated upon the use of special elastic mounting or journalling equipment for the workpiece but, as shown by the embodiments, can be performed with workpiece accommodating structures mounted for vibration in only a single direction of a reference plane.

Figure 3:
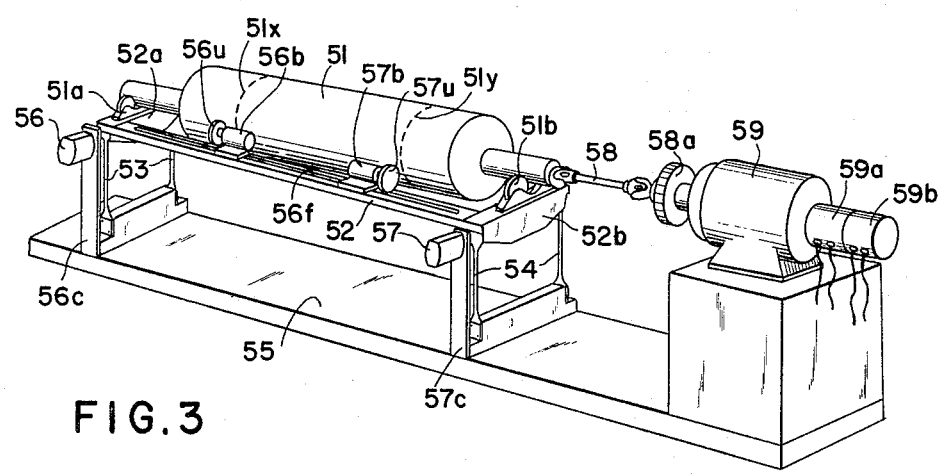
FIG. 3 is a perspective view of a device according to the present invention.

FIG. 3 illustrates a device according to the present invention. FIG. 3 is similar to FIG. 1 and like numerals therein refer to the parts corresponding to those of FIG. 1. FIG. 3 differs from FIG. 1 in that the exciters 56a and 57a in members 56 and 57 are eliminated. Instead a brace 52 extending between the vibratory journalling bridges 52a and 52b support two vibrating exciters 56b and 57b each comprising a motor and an eccentric offset wheel 56u, 57u on an axis parallel to the axis of workpiece 51. The exciters are suitably adjustable by means of a guide 56f to positions on the brace 52 so that the wheels 56u and 57u are coplanar with any desired correction or reference planes such as 51x and 51y of the workpiece 51. The members 51a and 51b are roller bearings for the shafts of the workpiece, members 56 and 57 the vibration pickups, and members 56c and 57c the supports therefor, which along with the supplementary exciters 56b and 57b, are movable along the workpiece axis. The leaf springs 53 and 54 support the bearing bridges 52a and 52b. A universal joint 58 connects the workpiece to the motor 59 as shown also in FIG. 1.

Figure 4:
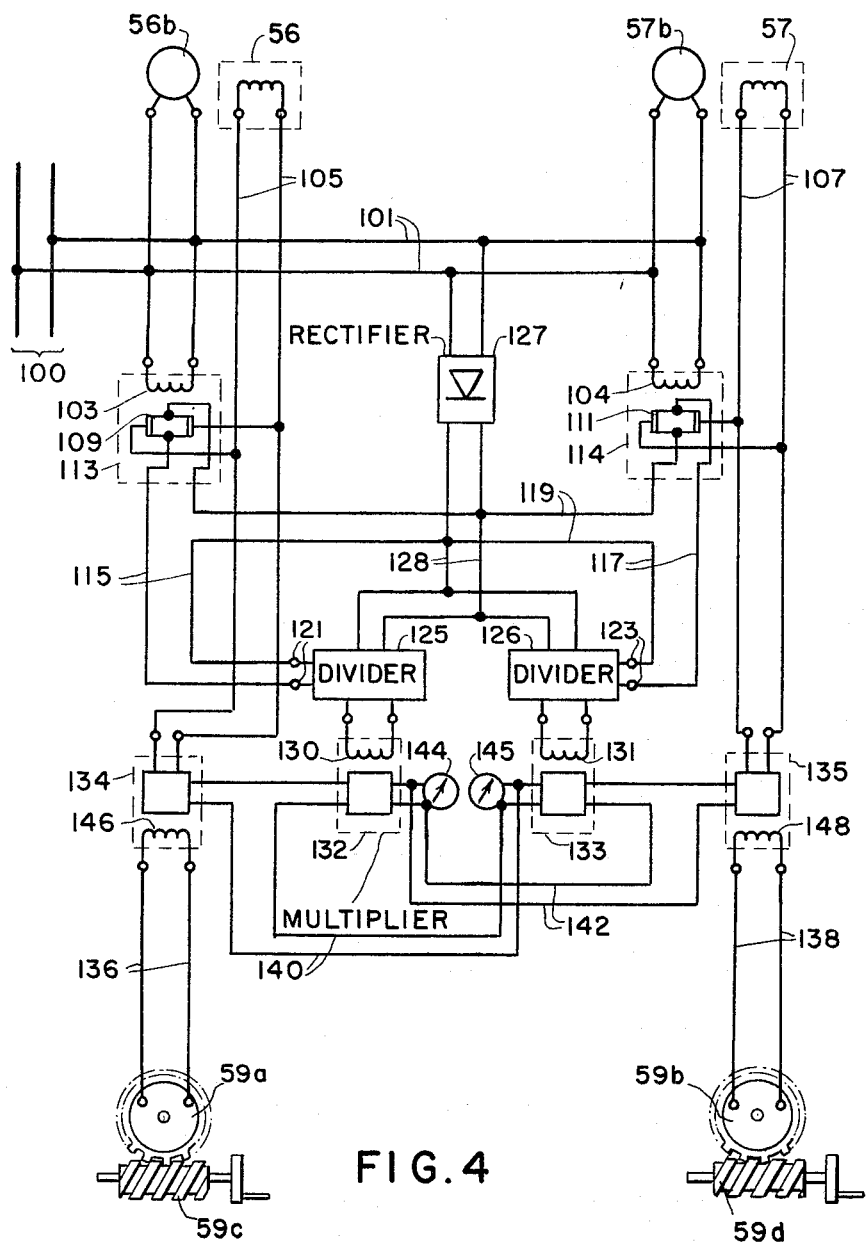
FIG. 4 is a circuit diagram of the device of the present invention.

FIG. 4 is a circuit diagram according to the present invention. It differs from that of FIG. 2 in that the transducers 56 and 57 do not contain exciting coils 56a and 57a. Instead, the motors 56b and 57b are connected in place of the exciting coils 56a and 57a respectively.

In operation the wheels 56u and 57u impart known vibrations to the workpiece 51 in the planes 51x and 51y. These vibrations, in addition to those caused by the unbalance in the workpiece 51, are sensed by the pickups 56 and 57. The unbalance in planes 51x and 51y is computed by the circuit of FIG. 4 in the same manner as that of FIG. 2.

As a result it is possible to measure unbalance in a number of reference planes or positions without precalibration, this being accomplished by making the supplementary exciters adjustable and moving them into the desired correction plane, as in FIG. 3, either with or without the vibration pickups.

I claim:
1. A method of measuring unbalance of a rotating member having an axis, comprising the steps of
 journalling said member in journalling means for elastic deflection in a direction transverse to the axis of said member;
 rotating said member at a determined rotation frequency;
 simultaneously applying to said member a vibratory excitation of determined magnitude at an excitation frequency different from said rotation frequency;
 applying said vibratory excitation to said member in any selected reference plane transverse to the axis of said member and axially spaced from said means;
 sensing the resultant vibrations of said member by sensing the deflection thereof and producing transducter voltages corresponding to said resultant vibrations;
 providing a first reference voltage in synchronism with the rotation of said member;
 providing a second reference voltage in synchronism with said vibratory excitation; and
 deriving from said transducer voltages and said first and second reference voltages a signal corresponding to unbalance of said member.

2. Unbalance measuring apparatus, comprising
a pair of spaced journal means for rotatably supporting a rotor to be tested for unbalance in a selectable reference plane, said rotor having an axis and each of said journal means being deflectable in a direction transverse to the axis of said rotor;
drive means coupled to said rotor for rotating said rotor at a determined rotation frequency;
vibrating exciter means in contact with said rotor for subjecting said rotor to an excitation vibration in superposition with vibration due to unbalance of said rotor, said exciter means having a determined magnitude and an excitation frequency different from said rotation frequency;
exciter mounting means movably mounting said exciter means for contact with said rotor in any selected reference plane transverse to the axis of said rotor and spaced from said journal means;
transducer means positioned in operative proximity with said journal means for responding to resultant rotor vibrations to produce corresponding transducer voltages;
a first source of phase reference voltage for providing a first reference voltage in synchronism with the rotation of said rotor;
a second source of phase reference voltage for providing a second reference voltage in synchronism with said exciter means; and
computer means having output means and input means coupled to said transducer means and to said first and second sources of reference voltage for deriving from said transducer voltages and said first and second reference voltages a signal corresponding to unbalance of said rotor and for providing said signal at said output means for each selected reference plane.

3. Unbalance measuring apparatus as claimed in claim 2 wherein said exciter mounting means comprises brace means extending between said journal means and guide means supported by said brace means for guiding said vibrating exciter means in directions parallel to the axis of said rotor.

4. Unbalance measuring apparatus as claimed in claim 3, wherein said vibrating exciter means comprises a motor and an eccentric offset wheel driven by said motor and contacting said rotor in the selected reference plane.

5. Unbalance measuring apparatus as claimed in claim 4, wherein the eccentric offset wheel of said vibrating exciter means is coplanarly positioned with the selected reference plane.

6. Unbalance measuring apparatus as claimed in claim 2, wherein said vibrating exciter means comprises a plurality of vibrating exciters each in contact with said rotor for subjecting said rotor to an excitation vibration in superposition with vibration due to unbalance of said rotor, each of said exciters having a determined magnitude and an excitation frequency different from said rotation frequency, and wherein said exciter mounting means movably mounts each of said exciters for contact with said rotor in a selected reference plane transverse to the axis of said rotor and spaced from said journal means and from the selected reference planes of the others of said exciters.

7. Unbalance measuring apparatus as claimed in claim 6, wherein said exciter mounting means comprises brace means extending between said journal means and guide means supported by said brace means for guiding each of said vibrating exciters in directions parallel to the axis of said rotor.

8. Unbalance measuring apparatus as claimed in claim 7, wherein each of said vibrating exciters comprises a motor and an eccentric offset wheel driven by said motor and contacting said rotor in a selected reference plane.

9. Unbalance measuring apparatus as claimed in claim 8, wherein the eccentric offset wheel of each of said vibrating exciters is coplanarly positioned with the corresponding reference plane.

10. Unbalance measuring apparatus as claimed in claim 2, wherein said vibrating exciter means comprises two vibrating exciters.

No references cited.

RICHARD C. QUEISSER, *Primary Examiner.*
JAMES J. GILL, *Assistant Examiner.*